US009002683B2

(12) United States Patent
Schulz et al.

(10) Patent No.: US 9,002,683 B2
(45) Date of Patent: Apr. 7, 2015

(54) METHOD FOR DETERMINING THE CUT QUALITY OF A LASER CUTTING PROCESS USING A SIMULATION PROGRAM

(75) Inventors: Wolfgang Schulz, Langerwehe (DE); Jens Schuettler, Aachen (DE); George Vossen, Duesseldorf (DE); Markus Niessen, Niederzier (DE)

(73) Assignees: Fraunhofer-Gesellschaft zur Foerderung der Angewandten Forschung E.V., Munich (DE); Rheinisch-Westfaelische Technische Hochschule Aachen, Aachen (DE)

( * ) Notice: Subject to any disclaimer, the term of this patent is extended or adjusted under 35 U.S.C. 154(b) by 269 days.

(21) Appl. No.: 13/521,804
(22) PCT Filed: Jan. 25, 2011
(86) PCT No.: PCT/EP2011/000285
§ 371 (c)(1),
(2), (4) Date: Jul. 12, 2012
(87) PCT Pub. No.: WO2011/095290
PCT Pub. Date: Aug. 11, 2011

(65) Prior Publication Data
US 2012/0290276 A1 Nov. 15, 2012

(30) Foreign Application Priority Data
Feb. 8, 2010 (DE) .......................... 10 2010 007 323

(51) Int. Cl.
G06F 17/50 (2006.01)
B23K 26/06 (2014.01)
B23K 26/38 (2014.01)

(52) U.S. Cl.
CPC ............. *B23K 26/06* (2013.01); *B23K 26/38* (2013.01); *G06F 17/5009* (2013.01); *G06F 2217/78* (2013.01); *G06F 2217/80* (2013.01)

(58) Field of Classification Search
USPC .......................................... 703/2, 19
See application file for complete search history.

(56) References Cited

U.S. PATENT DOCUMENTS

| | | | |
|---|---|---|---|
| 5,854,751 A | 12/1998 | Di Pietro et al. | |
| 2011/0108533 A1* | 5/2011 | Boettcher et al. | 219/121.72 |
| 2011/0120982 A1* | 5/2011 | Sepp et al. | 219/121.72 |

FOREIGN PATENT DOCUMENTS

| | | |
|---|---|---|
| EP | 0929376 B1 | 9/1997 |
| JP | 4052091 A | 2/1992 |

OTHER PUBLICATIONS

W. Schutz et al. "Modeling and Simulation of Process Monitoring and Control in Laser Cutting"; "23" in G. Radon and R. Neugebauer, "Nonlinear Dynamics of Production Systems", 2004, VCH erlag GmbH & Co. KGaA, Weinheim, ISBN: 3-527-40430-9; pp. 411-426.
Schulz W. "Simulation of Laser Cutting" in The Theory of Laser Materials Processing, edited by J. Dowden, Springer Series in Materials Science, 2009, vol. 119, p. 21-69. ISBN 13 978-1-4020-9339-5.
Schulz W. entitled "Dynamics or ripple formation and melt flow in laser beam cutting", in J. Phys. D: Appl. Phys., 1999, vol. 32, p. 1219-1228.

* cited by examiner

*Primary Examiner* — Thai Phan
(74) *Attorney, Agent, or Firm* — Karl F. Milde, Jr.; Eckert Seamans Cherin & Mellott, LLC

(57) ABSTRACT

The application relates to a method for determining the cut quality of a laser cutting process, said quality being assessed on the basis of the formation of solidification ridges along the cut face and/or burr formation on the lower edge of the cut face. In said method, a virtual laser cutting machine in a simulation program can be virtually operated with a set of values P0 from a parameter space P.; In a step a), the parameter set P0 is entered in the virtual cutting machine (103), then in step b), a cut is made in the virtual workpiece by calculating, from partial differential equations with initial and boundary values, the progression of the melt film thickness over time and the position of the melt front at the apex of the cutting front according to the depth of the cut and the time, and then in step c), the spatial distribution of the ridge amplitude on the cut face is specified by projecting the progression of the absorption front onto the cut face and/or a spatial distribution of the burr is calculated from the progression of the melt film thickness over time and the discharge speed on the lower edge of the cut face, and in step d), a virtual cut quality is provided (104) for further analysis.

12 Claims, 1 Drawing Sheet

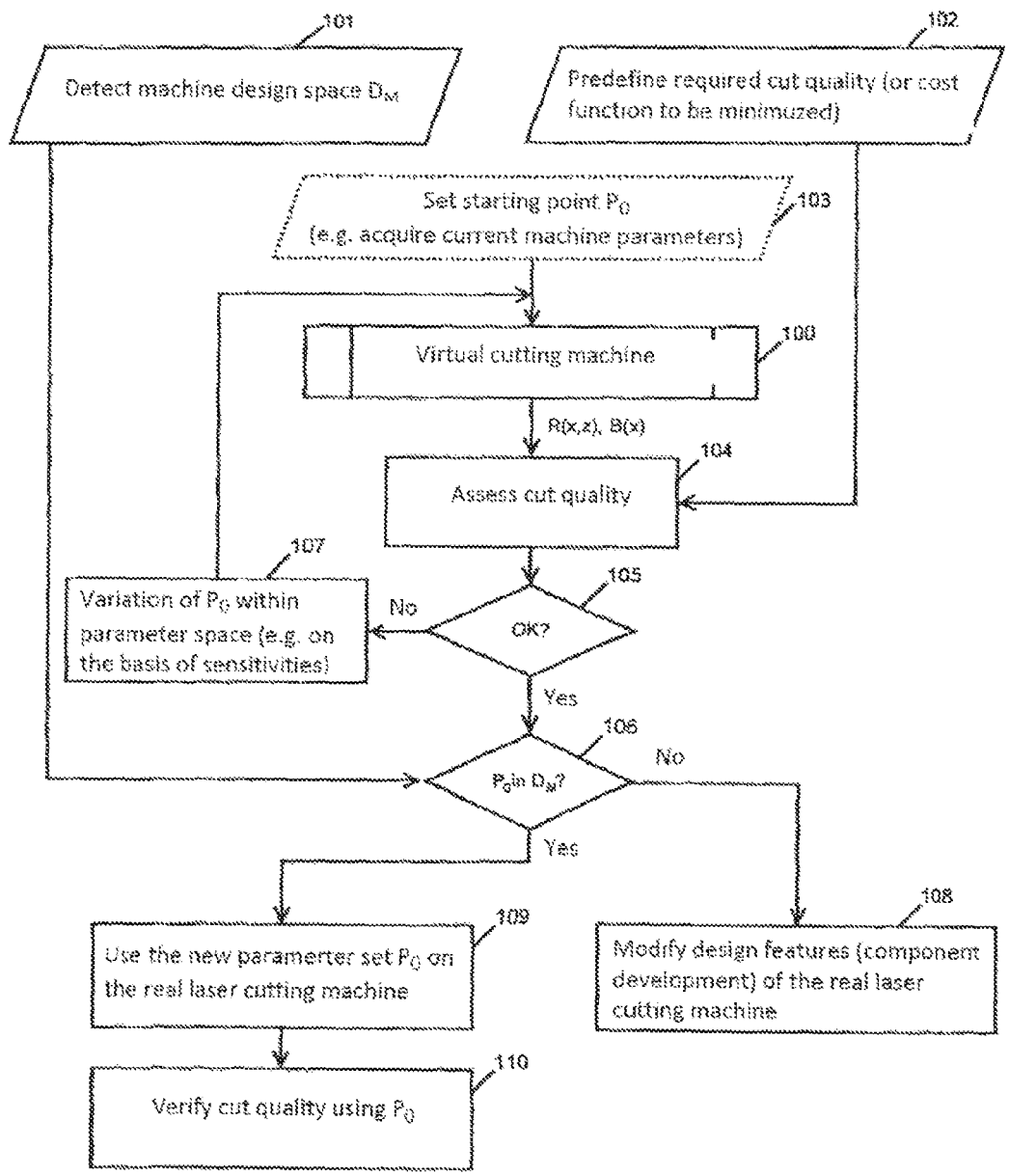

METHOD FOR DETERMINING THE CUT QUALITY OF A LASER CUTTING PROCESS USING A SIMULATION PROGRAM

BACKGROUND OF THE INVENTION

The present invention relates to a method for determining the cut quality of a laser cutting process, which is assessed based on the formation of solidification ridges along the cut face and/or burr formation at the bottom edge of the cut face, where in a simulation program a virtual laser cutting machine is provided that can be operated virtually using a set of values $P_0$ from a parameter space P.

Laser cutting is an established separation process. Among the laser-aided manufacturing methods, it takes the leading position in industrial applications. From the user's perspective, high productivity with high quality is demanded for such manufacturing methods.

Currently, high quality $CO_2$-Lasers (10μ-emitters) with a radiation wavelength of approx. 10 μm and with a laser power of 1-6 kW are employed industrially for laser cutting in the field of macro applications for sheet metal thicknesses ranging from 1 mm to 30 mm. In addition, new laser sources are available today, such as fiber lasers and disc lasers (1μ-emitters) with a radiation wavelength of about 1 μm, with a laser power of currently 1-8 kW, and a much better beam quality than the $CO_2$ lasers. Such 1μ-emitters offer significant economic advantages over the established 10μ-emitters. However, 1μ-emitters have a poorer cut quality compared to 10μ-emitters, which is an obstacle to the use of 1μ-emitters.

The quality of cuts along a workpiece can be assessed based on the morphology of a ridge structure that forms on the cut face and a burr formation due to molten material at the lower edge of the cut face. Low ridge and burr formation are required in addition to flatness and squareness of the cut face.

The process chain 'cutting-welding' is one example in which the significance of the quality of the cut face for preparing the joining gap can be recognized. To be able to generate slim welding seams with a laser, where said seams require no post-processing by grinding or dressing, cuts of the components to be joined having plane, right-angled, smooth cut faces that are burr and oxide free are desired.

The mechanism that leads to the formation of ridges and burrs as well as oxide layers along the cut face and the cut edge of the workpiece was examined for the above reasons.

Ridges arise at the cut face and the amplitude of the ridges increases abruptly at a certain depth of the cut, i.e., a change occurs from finer to coarser ridges.

The amplitude of the coarse ridges becomes greater with an increasing thickness of the material to be cut.

The coarser ridges are interrupted repeatedly or exhibit irregular spacing (number of ridges in the cutting direction changes with the depth of the cut).

This axial structure or an interruption of the ridges produces an irregular structure of the cut face and is undesirable. Today, the achievable ridge amplitude is smaller for the 10μ-emitter than for the 1μ-emitter.

Ridges with the greatest amplitudes caused by the solidification of molten metal on the cut face occur especially in the lower part of the cut face or with large material thicknesses.

In particular with high feed rates the melt does not fully come off the bottom edge. The attached and then solidifying melt forms the undesired burr. The mechanisms for the burr formation are understood only to a certain degree, which means that the potential productivity values of cutting equipment is significantly under-utilized today.

The formation of cracks and pores in the weld seam can be caused by oxidized joining edges, as they occur during flame cutting. For this reason, fusion cutting is performed with an inert cutting gas to obtain oxide free cut faces.

Document EP-B1 0929 376 describes a method for laser beam treatment, which is said to be particularly suitable for cutting large material thicknesses of 15 mm or greater. According to this method several foci are created, which are positioned in the axial direction along the thickness of the material to produce a large depth effect of the laser radiation. However, it appears that despite the measures recommended in this document, the formation of ridges and burrs occurs with an unchanged severity. Also, the portions of the laser radiation with a deeper focus lead to an unwanted expansion (rounding) of the kerf on the upper edge of the material.

The current state-of-the-art is not sufficient to establish a quality cut using the 1μ-emitter for a sheet thickness of more than 2 mm and to expand the quality cut to more than 15 mm sheet thickness using the 10μ-emitter. The reasons for these technical limitations are that
  an extension of the limits for the cut quality cannot be achieved according to the present experimental experience using 1μ-emitters and 10μ-emitters and with today's available laser and process parameter settings
  the existing understanding about the formation of ridges and burrs is insufficient to recognize, for example, the necessary, fundamental new effects of a beam-shaping and then specify beam-shaping measures.

For these reasons, experts today only propose measures to improve the cutting process using 1μ-emitters, which are known from the experiences of cutting using 10μ-emitters. Thus far, these measures have been unsuccessful and the 1μ-emitter still cannot achieve the cut quality of the 10μ-emitter. In addition, no physical cause is known that could explain the different cut quality.

The state of the technology and science verifies that at least two types of ridges exist, namely melting ridges and solidification ridges with their morphology giving an indication of the underlying formation mechanism.

Among others, the document, Schulz W. entitled "Simulation of Laser Cutting" in *The Theory of Laser Materials Processing*, edited by J. Dowden, Springer Series in Materials Science, 2009, Vol. 119, P. 21-69. ISBN 13 978-1-4020-9339-5, describes the simulation of laser cutting. Differential equations are listed for this, among other things. The document also deals with the Weber number. Among others also, the document, Schulz W. entitled "Dynamics or ripple formation and melt flow in laser beam cutting", in *J. Phys. D: Appl. Phys.*, 1999, Vol. 32, P. 1219-1228, examines the dynamic behavior of ridge formation and the melt flow during laser cutting of metals. According to the information given in these two documents, it is possible to calculate the ridge formation during laser cutting, i.e., always by specifying interferences that act on the system from the outside. Only melt ridges are observed according to these documents.

Melting ridges form on the upper side of the cut face solely by movement of the melt front in the absence of solidified melt and have a small amplitude compared to solidification ridges and are technically of minor significance.

Solidification ridges form in greater cutting depth, typically 1 to 2 mm below the top edge of the sheet being cut, by wave-like formation of the melt front and by wave-like solidifying melt and have a great amplitude compared to the melting ridges and are technically very significant.

According to the state-of-the-art and science, the correlation between the ridge and burr formation on the one hand and the laser, machine and material parameters on the other hand is not clarified. For this reason, making a quality cut using the new laser sources (e.g., fiber lasers) is still not mastered, which prevents the wide application of the new radiation sources and is the subject of worldwide research.

SUMMARY OF THE INVENTION

It is the object of the present invention to provide a method that allows for the determination of the cut quality of a laser cutting process by using specific parameters both for a potential real laser cutting machine that is to be employed and specific parameters of the material to be cut as well as required process parameters. An options should also be provided for targeted adjustment of the cut face roughness.

This objective, as well as other objects which will become apparent from the discussion that follows, are achieved, in accordance with the present invention, by a method which allows for the determination of the cut quality of a laser cutting process. According to this method, the result of the cutting operation to be performed with a given laser cutting machine, is assessed based on the formation of solidification ridges along the cut face and/or the burr formation at the bottom edge of the cut face. This method is not performed on an real laser cutting machine. Rather, a simulation program provides a virtual laser cutting machine, which can be operated virtually using a set of values $P_0$ from a parameter space P.

This parameter space P is defined by $$P=(\lambda_{Laser}, l_0(t), f(x,z,t), \underline{s}(x,z,t), \underline{p}(x,z,t), P_g(x,z,t), \tau(x,z,t), v_0(t), d, P_{Material}), \text{ where}$$

$$P_{Material}=(\rho_s, c_{ps}, \lambda_s, \rho_l, c_{pl}, \lambda_l, H_m, H_v, T_m, T_v, \eta, \sigma, n_{cs}, n_{cl}, \text{ where}$$

$\lambda_{Laser}$ represents the wavelength of the laser radiation,
$l_0(t)$ the maximum value of the laser radiation intensity over time,
$f(x,z,t)$ the spatial distribution of the laser radiation intensity over time,
$\underline{s}(x,z,t)$ the spatial distribution of the direction of the laser radiation over time,
$\underline{p}(x,z,t)$ the spatial distribution of the polarization state of the laser radiation over time,
$P_g(x,z,t)$ the cutting gas pressure over time,
$\tau_g(x,z,t)$ the shear stress of the cutting gas over time,
$v_0(t)$ the feed rate, defined as the relative velocity between the laser beam axis and the workpiece over time,
d the thickness of the sheet metal to be cut,
$\rho_s$ the density of the material to be cut in the solid state,
$c_{ps}$ the specific heat capacity of the material in the solid state,
$\lambda_s$ the thermal conductivity of the material in the solid state,
$\rho_l$ the density of the melt,
$c_{pl}$ the specific heat capacity of the melt,
$\lambda_l$ the thermal conductivity of the melt,
$H_m$ the melting enthalpy of the material to be cut,
$H_v$ the evaporation enthalpy of the material to be cut,
$T_m$ the melting temperature of the material to be cut,
$T_v$ the evaporation temperature of the material to be cut,
$\eta$ the dynamic viscosity of the melt,
$\sigma$ the surface tension of the melt,
$n_{cs}$ the complex refractive index of the material in the solid state,
$n_{cl}$ the complex refractive index of the melt,
and where
x represents the coordinate in the direction of the relative movement between the material and the laser beam axis and
z the coordinate perpendicular to the top of the material, and
t represents the time.

According to the method, the parameter set $P_0$ is entered into the virtual cutting machine for the simulation program sequence in a step (a).

Then in a step (b), a virtual workpiece is created in a virtual cutting operation using the virtual cutting machine by developing the melt film thickness h=h(z,t) and the position M=M(z,t) of the melt front at the apex of the cut front over time as a function of the cut depth z (0<z<d, d sheet metal thickness) and the time t from the partial differential equations PDE normalized to $v_0$ $$\frac{\partial h}{\partial t} + G(z, t; h, P_0)\frac{\partial h}{\partial z} + D(z, t; h, P_0) = v_p, \quad \frac{\partial M}{\partial t} = v_p - 1$$

with initial and boundary values $$h(z,t=0)=h_0(z), M(z,t=0)=M_0(z)$$

$$h(z=0,t)=0, M(z=0,t)=m_0(t;P_0)$$

where $h_0(z)$ and $M_0(z)$ represent any initial distributions, $m_0(t;P_0)$ the position of the upper edge of the cutting front, $v_p=v_p(z,t)$ the velocity of the melt front, $v_s=G(z,t; h, P_0)$ the flow velocity at the surface of the melt and $D(z,t;h,P_0)$ a damping of the melt film dynamics,
and for a given parameter set $P_0$ is calculated from P.

Then, in a step (c) by a projection of the time course of the absorption front, defined as the position M(z,t)–h(z,t), onto the cut face with a transfer function determined by the feed rate $v_0$ that depicts t on x, the spatial distribution of the ridge amplitude R(x,z) on the cut face is specified. Additionally or alternatively, a spatial distribution of the burr B(x) at the lower edge of the cut face is calculated from the time course of the melt film thickness h(z=d,t) and the outflow velocity G(z=d,t; h(z=d,t), $P_0$) at the lower edge of the cut face.

Finally, in step (d) a virtual cutting result comprising R(x,z) and/or B(x), is provided for further assessment.

Thus, the method according to the invention utilizes a virtual cutting machine to calculate the formation of solidification ridges at a virtual cut face and the burr formation at the bottom of the virtual cut face with the use of the differential equations DE. In particular the method can be used to specify a time-related modulation of the cutting parameters, which in turn can be used to set the spatial distribution of the ridge amplitude on the cut face. The differential equation $$\frac{\partial M}{\partial t} = vp - 1$$

is a non-dimensional equation; the parameters are scaled to the reference parameter, the feed velocity $v_0$, wherein the feed velocity $v_0$ is defined as the relative speed between laser beam axis and workpiece. The differential equation for $v_p$ is also scaled to $v_0$.

This ability to set the ridge amplitude on the cut face in a defined manner can be used not only to keep the ridges as small as possible, but also to represent an image or a logo on the cut face. One area of application of the method according to the invention, however, is to specify those cutting parameters for which the physical limit of the smallest possible ridge amplitude is reached. The words "the smallest possible ridge amplitude" here means that under certain cutting conditions ridges will remain despite an optimization of the cutting conditions, where such ridges occur through technically unavoidable fluctuations of the cutting parameters and therefore cannot be eliminated but only limited to smaller values.

The simulation program, which is the basis of the method according to the invention, uses the knowledge that solidification ridges and burrs form by excitation of axially traveling waves at the apex of the cutting front, which means removal fluctuations arise at the apex of the cutting front, and that there are two physical reasons for this.

It is known that ridges and burr occur
  due to instability inherent in the cutting process and with specified stability limits, and
  due to external interferences, which
    can be caused by unavoidable fluctuations of laser and machine parameters, or
    by spatial fluctuations in the material properties (e.g., grain boundaries), or
  can be due to an intentionally set modulation of the parameters of the cutting process (e.g., modulation of the laser radiation or of the cutting gas flow).

The simulation program is based on a physical ridge model with which the spatial distribution of the ridge amplitude R can be calculated on the cut face. The ridge amplitude R=R (x,z) depends on the cutting position x along the cut face and the cutting depth z, as well as cutting parameters P.

The set of values of $P_0$ from the parameter space P consists of laser, machine and material parameters and, among other things takes into account spatially distributed parameters such as the intensity of the laser radiation and the driving forces—these are the spatial gradient of the gas pressure and the shear stress of the gas at the surface of the melt film—of the cutting the gas flow on the melt to be driven out.

It is also essential that in addition to the mean values of the parameters this set of parameters also contains their technically unavoidable fluctuations.

Furthermore, this set of parameters also contains in addition to the mean values of the parameters and their technically unavoidable fluctuations intentionally set temporal modulations. The productivity, for example the cutting speed, can be increased by a temporal modulation of the parameters, and this optimization can be carried out by the simulation program on a virtual laser cutting machine and therefore at low cost. This optimization opportunity is provided in that the ridge morphology can be adjusted in a targeted manner by a temporal modulation of the parameters, such that defined structures can be generated for the ridges to a minimization of the ridge structure. When cutting, this modulation may be used ultimately to also form a logo or an image on the cut face.

The burr formation at the cut face is also taken into account in the simulation program by computing and considering the properties of the resulting burr through utilizing the physical ridge model and from the calculated ridge amplitude R(x,z). A burr can be characterized by the following parameters The burr width $b_B$ in the feed direction and hence the distance measured in the feed direction, where the solidified melt adheres to the underside of the sheet metal or the bottom edge of the cut face,
  The burr volume $V_B$; the volume of solidified melt that adheres to the underside of the cut sheet metal, i.e., below the lower cut edge,
  The burr height $h_B$; this is the height of the solidified melt that adheres to the underside of the cut sheet metal.

Thus, the simulation program also takes into account whether the burr consists of a kind of burr beads, or a kind of burr strings. By definition, a burr bead forms where the burr height $h_B$ is less than or equal to the burr width $b_B$, while a burr string arises when the burr height $h_B$ is greater than the burr width $b_B$.

In the set of values $P_0$ of the parameter space P, thermophysical parameters, such as the melting temperature $T_m$ and the vaporization temperature $T_v$ of the melt film surface at the lower edge, and material parameters, such as the surface tension of the melt, are taken into account as well.

The method according to the invention is used for laser cutting with reactive cutting gas beam and for laser cutting with inert cutting gas beam. With respect to the latter method, distinctions are made between the variants beam fusion cutting, quick cutting and high-speed cutting.

Based on the simulation program and by specifying a virtual laser cutting machine that meets the ideal conditions and is universally adjustable, the theoretically optimal values Popt can be determined for the parameters P for one predefined ridge morphology (e.g., minimal roughness) and a burr-free cut face by varying the parameter values $P_0$ through repeating the steps a) to d) each time with different parameters from the parameter space P.

The cutting machines available today are not technically perfect and exhibit a restricted design space depending on the manufacturer. The theoretically optimal sets of parameters from the virtual cutting machine resulting from the method according to the invention by applying the simulation program cannot always be implemented in a real cutting machine. Therefore, the results obtained with the simulation program are used to Improve a real laser cutting machine in certain parameters or even to dimension it anew, by determining based on the results of the simulation program the causes or the parameters that lead to an undesirable development of the ridge amplitude and/or to unwanted burr formation. For this purpose, the individual values $P_0$ of the parameter space P are viewed and analyzed in order to then select and change those values from the parameter space P that lead to the best approximation of the values $P_0$ of the parameter space P.

Such an approximation is thus based on a virtual path and can also be accomplished by iterative changes in the values $P_0$ of the parameter space P. If necessary, the found, approximate parameters can be verified in real cutting experiments. From the information obtained via the method, required process parameters or boundary conditions for the required components of the laser cutting machine can be derived that concern the shaping of laser radiation and the cutting gas flow.

An essential step in the method according to the invention lies in the mathematical-physical calculation of ridges on the cut face and the burr formation. This calculation is based on a high-dimensional set of coupled, nonlinear, partial integro-differential equations (differential equations, which, in addition to derivatives also contain the integrals of the dynamic variables) of at least the fifth order, with some of the involved partial differential equations are of the known Kuramoto-Sivashinsky type. However, in order to solve this complex task, the method according to the invention is based on a greatly simplified system developed by the inventor, said system comprising only two partial differential equations of the first order for only two variables in order to replace the differential equations of the higher orders.

With these two differential equations, $$\frac{\partial h}{\partial t} + G(z,t;h,P_0)\frac{\partial h}{\partial z} + D(z,t;h,P_0) = v_p, \frac{\partial M}{\partial t} = v_p - 1$$

with the initial and boundary values $$h(z,t=0)=h_0(z), M(z,t=0)=M_0(z)$$

$$h(z=0,t)=0, M(z=0,t)=m_0(t;P_0)$$

where $h_0(z)$ and $M_0(z)$ represent any initial distributions, $m_0(t;P_0)$ represents the position of the upper edge of the cutting front, $vp=vp(z,t)$ represents the speed of the melt front, $v_s=G(z,t;h,P_0)$ represents the flow velocity at the surface of the melt and $D(z,t;h,P_0)$ represents a damping of the melt film dynamic, a temporal development of the melt film thickness $h=h(z,t)$ and of the position $M=M(z,t)$ of the melt front at the apex of the cutting front is calculated as a function of the cutting depth z (0<z<d, d sheet metal thickness) and the time t.

For the remaining quantities that can enter into the model that underlies the simulation program and that are to be specified at the apex of the cutting front, different physical models known from the literature can be used to determine the parameters Position $m_0(t;P_0)$ at the upper edge of the cutting front
Velocity $v_p=v_p(z,t)$ of the melt front
Flow velocity $v_s=G(z,t;h,P_0)$ at the surface of the melt
Damping D $(z,t;h,P_0)$ of the melt film dynamic.

Different levels of approximation can be specified for the calculation of these quantities.

It shall be taken into account that the velocity of the melt front $v_p=N[M-h, Q_A]$ couples the two differential equations in a nonlinear manner. The velocity $v_p$ of the melt front is calculated by a nonlinear operator N, which depends also on the absorbed energy flux density $Q_A$.

The absorbed energy flux density $Q_A$, $$Q_A=\mu A(\mu)I_0 f(x,z;t)|_{x=M-h}, \mu=\cos(\underline{s}\cdot\underline{n}),$$

is calculated from the cosine of the angle of incidence $\mu$, the absorption coefficient $A(\mu)$ of the maximum intensity $I_0$ and the distribution f (0<f<1) of the laser radiation intensity. The angle of incidence is enclosed by the direction vector $\underline{s}$ of the energy flux density of the laser and the normal vector $\underline{n}$ of the surface of the melt film. The distribution f (0<f<1) of the intensity depends on the spatial coordinates x, z, with x representing the feed velocity and z the direction of propagation of the radiation, and of parameters $P_f$ that are used to parameterize the distribution.

The flow rate $v_s=G(z,t;h,P_0)$ at the surface x=M-h of the melt is specified by a function G, which is determined from the flow of the cutting gas and the flow of the melt.

The damping $D(z,t;h,P_0)$ in the differential equations DE can be set to zero in certain models and is thus not considered.

The properties of the resulting burr are calculated utilizing the physical ridge model and from the ridge amplitude R(x, z=d) at the lower edge of the cut face calculated from it according to the invention as follows:

The burr width $b_B$ in the feed direction—that is the distance measured in the feed direction on the underside of the sheet metal, where the solidified melt adheres—is calculated by $b_B=v_0(t_2-t_1)$, where $v_0$ is the feed speed. According to the invention, the out flowing melt cannot separate between the times $t_1$ and $t_2$, and thus adheres to the sheet metal and solidifies. The time $t_1$ is determined by the condition $$We=We(h(z=d,t);P_0)<We_{crit},$$

where the quantity We $$We=(\rho v_s^2)/(\sigma/h_d)$$

is referred to as the Weber number with $h_d$ specifying the dimensional thickness of the melt film on the underside of the sheet metal. The time $t_2$ is defined by the condition $We>We_{crit}$, thus, the time span $t_2-t_1$ is the time interval during which We drops below $We_{crit}$. For the quantities $v_s=G(z,t;h, P_0)$ and $h_d$, the solution from the physical ridge model shall be entered in the expression for the Weber number. The value $We_{crit}$ shall be determined separately and physical models or experimental results can be used for this.

The Weber number We is a dimensionless characteristic, which serves as a measure for a bead deformation. The larger it is, the greater is the deformation effect and the farther away the bead has moved from the spherical shape. The relationship between the burr formation and the Weber number is known in the art.

The referenced burr volume $V_B$, i.e., the volume of the solidified melt that adheres underneath the cut sheet metal is determined using the found value for the burr width $b_B=v_0(t_2-t_1)$. With this value for the burr width $b_B=v_0(t_2-t_1)$, the outflow velocity $v_s$ and the condition $V_B=V(t_2-t_1)$, wherein the volume $V(t_2-t_1)$ is determined by the melt that flows out at the bottom z=d in the interval $t_2-t_1$, the value for the burr volume $V_B$ follows.

The burr height $h_B$, i.e., the height of the solidified melt that adheres below the cut sheet, is calculated from the solution h(z=d,t) of the differential equations DE and the values for the burr width $b_B$ and the burr volume $V_B$.

By a projection of the time course of $V_B(t)$ with a transfer function that is determined by the feed speed $v_0$ and that displays t on x, the spatial distribution of the burr volume/burr height can be specified along the lower edge of the cut face $h_B(x)$.

Further, for determining the parameters at which burr formation through evaporation begins, the temperature $T_s(t)=T(M(z=d,t)-h(z=d,t),z=d,t)$ can be determined on the surface of the melt, where T(x,z,t) represents the temperature in the melt. The temperature in the melt is determined by applying the heat conduction equation. When $T_s$ is >vaporization temperature $T_v$, then a burr formation occurs.

To assess the virtual cut quality, one or more characteristic(s) K of the ridges, such as the roughness of the cut face $R_z$ and of the burr, e.g., the burr volume $V_B$, the burr height $h_B$, the burr width $b_B$ are derived from the virtual cutting result, consisting of R(x,z) and/or B(x). The choice of which characteristic is used is up to the respective user of the method. The characteristic quantities are selected user-specific, and R(x,z) and/or B(x) are sufficient for the assessment of the cut quality.

In order to optimize the respective quality of a method procedure even further, steps a) to d) of the method, as indicated in claim 1, are repeated at least once in a vicinity of the parameter set $P_0$ in the parameter space P. This allows for specifying the sensitivities, defined as partial mathematical derivatives of the cutting result or characteristic(s) K according to parameters of P for the parameter set $P_0$.

Through an alternative process measure, namely by mathematical analysis of the solution structure of the differential equations DE, these sensitivities, defined as partial mathematical derivatives of the cutting result or of the characteristic(s) K according to parameters of P, of the parameter can be specified.

Another alternative method for specifying the sensitivities is the one by automatic differentiation. Automatic differentiation is a mathematical method known in the art, to form partial mathematical derivatives of a function.

By repeating the method steps (a) to (d) of the method, each time with changed parameters from the parameter space P, values of the parameters from the parameter space P of the laser cutting process are determined for the purpose of obtaining defined cut faces and/or for determining the cut faces that can be achieved with a specified laser cutting machine, and/or for configuring components of an optimized laser cutting machine that meets or at least approximates the specifications regarding requirements for the cut faces.

From the foregoing process measure rules can be derived for the continued and/or new development of components of a real laser cutting machine via the values of the parameters from the parameter space P of the laser cutting process for obtaining defined cut faces that meet or at least approximate the specifications regarding requirements on the cut faces, if the determined values cannot be transferred to a real laser cutting machine with machine-specific parameters, known as machine-specific design space $D_M$, where $D_M$ is the subset of P that can be achieved without structural changes to the real laser cutting machine.

In order to apply an image or a logo on the cut face, values of the cutting parameters, potentially spatially and time-dependent values, are specified with which the spatial distribution of the ridge amplitude is to be set on the cut face.

For a special case, in which the specification calls for the lowest possible ridge amplitude, cutting parameters are specified, for which the physical limit of the smallest possible ridge amplitude is achieved, which may be limited, for example, by technically unavoidable fluctuations of the cutting parameters.

To calculate the characteristic(s) K, which are used to assess the cut quality in accordance with the stated requirements, an advantageous embodiment of the method according to claim 1 is to analyze different solutions of the differential equations DE using mathematical methods for their dynamic stability for different initial values $h(z,t=0)=h_0(z)$ and $M(z,t=0)=M_0(z)$. If unstable solutions exist, lower limits for the distribution of the ridge amplitude $R(x,z)$ can be specified from the degree of instability, and the respective characteristic(s) K calculated.

Also, subsets of P or $D_M$ can be specified, which meet or at least approximate the specifications with regard to the requirements regarding the cut faces. Such subsets of P (parameter space) and $D_M$ (design space) are limits that the user would like to adhere to in designing his laser cutting system and/or the cutting process.

For a full understanding of the present invention, reference should now be made to the following detailed description of the preferred embodiments of the invention as illustrated in the accompanying drawing.

BRIEF DESCRIPTION OF THE DRAWING

FIG. 1 is a schematic diagram detailing the method of the present invention.

DESCRIPTION OF THE PREFERRED EMBODIMENT

The method according to the invention, as shown in the diagram, employs a virtual cutting machine, which is designated with the reference character 100. For the implementation of the method, for one the design space DM is acquired, step 101, and secondly, the required cut quality entered, step 102. A cost function to be minimized can be specified in step 102 as well.

To start the virtual cutting machine 100, a start point $P_0$ is specified in step 103, for example by detecting the machine parameters of a current, real cutting machine. The set of values of $P_0$ is selected from the parameter space P, as is defined in greater detail above.

The simulation program is started by creating a virtual cut with the virtual cutting machine, which can be based on real values. The simulation program outputs a result of the cutting that includes the spatial distribution of the ridge amplitude $R(x,z)$ on the cut face and the spatial distribution of the burr $B(x)$ at the lower edge of the cut face.

The quality of cutting is assessed in step 104.

In step 105 a decision is made whether the virtually determined cut quality conforms to the specification of the required cut quality (step 102). If this is the case, the sequence of the process proceeds to step 106, where an examination is made if the set of values $P_0$ from the parameter space P is consistent with the design space $D_M$ of the machine, which was input in step 101.

If it is decided in step 105 that the cut quality does not correspond to the required cut quality, the sequence proceeds to step 107, where the set of values $P_0$ of the parameter space P are altered. Such a variation may for example be based on the sensitivities that are obtained through one of the methods according to claims 6 to 8. The altered values $P_0$ are then used to operate the virtual cutting machine 100.

The loop across the process steps 105, 107 and 104 is repeated until in step 105 the cut quality corresponds to the required cutting results.

If the query in step 106 is negated, the process ends in step 108; in step 108, the statement is made that a structural change of features of the real laser cutting machine, whose parameters (design space DM) have been used to run the simulation program, is required to meet or at least to approximate the specifications stated in step 102 of the required cut quality.

If the response to the query in step 106 is affirmative, the method proceeds to step 109; in step 109, a new set of values $P_0$ from the parameter space P is applied to the real laser cutting machine with parameters that have been specified in step 103 or in step 107.

In step 110, a cut made with the real laser cutting machine is then tested.

A real cutting machine can thus be configured by determining which values of the cutting parameters P lead to an undesired development of the ridge amplitude and/or lead to unwanted burr formation and what presents the best approximation $P_{an}$ of the parameters P to the desired cut quality, which are the theoretically optimal values $P_{opt}$.

To do this, the design space of the real cutting machine is determined. The design space of the real cutting machine contains the real adjustable values $P_{real}$ of the parameters from P. By applying the virtual laser cutting machine, the values $P_{an}$ of the parameters are found, which achieve the best approximation to the desired cut quality.

The quality is tested on the real cutting machine. A potentially remaining discrepancy between the desired and achieved cut quality on the real cutting machine can be improved by iterative refinement of the determination of the design space.

The invention can always be employed when during laser cutting the predominant portion of the melt is removed in front of or adjacent to the laser beam.

There has thus been shown and described a novel method for determining the cut quality of a laser cutting process using a simulation program which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A method for determining a cut quality of a laser cutting process, said quality being assessed on a basis of a formation of solidification ridges along a cut face of a sheet metal workpiece and/or a burr formation on a lower edge of the cut face, whereby in a simulation program a virtual laser cutting machine is provided that can be operated virtually with a set of values $P_0$ from a parameter space P, wherein the parameter space P is defined by $$P=(\lambda_{Laser}, I_0(t), f(x,z,t), s(x,z,t), p(x,z,t), P_g(x,z,t), \tau_g(x,z,t), v_0(t), d, P_{Material}), \text{ where}$$

$$P_{Material}=(\rho_s, c_{ps}, \lambda_s, \rho_l, c_{pl}, \lambda_l, H_m, H_v, T_m, T_v, \eta, \sigma, n_{cs}, n_{cl},$$

where $\lambda_{Laser}$ represents a wavelength of the laser radiation, $I_0(t)$ the maximum value of the laser radiation intensity over time, $f(x,z,t)$ represents a spatial distribution of the laser radiation intensity over time, $s(x,z,t)$ represents a spatial distribution of the direction of the laser radiation over time, $p(x,z,t)$ represents a spatial distribution of the polarization state of the laser radiation over time, $P_g(x,z,t)$ represents a cutting gas pressure over time, $\tau_g(x,z,t)$ represents a shear stress of the cutting gas over time, $v_0(t)$ represents a feed rate, defined as the relative velocity between the laser beam axis and the workpiece over time, d represents a thickness of the sheet metal to be cut, $\rho_s$ represents a density of a workpiece material to be cut in the solid state, $c_{ps}$ the specific heat capacity of the material in the solid state, $\lambda_s$ represents a thermal conductivity of the material in the solid state, $\rho_l$ represents a density of a laser cut melt of the workpiece, $c_{pl}$ represents a specific heat capacity of the melt, $\lambda_l$ represents a thermal conductivity of the melt, $H_m$ represents a melting enthalpy of the material to be cut, $H_v$ represents a evaporation enthalpy of the material to be cut, $T_m$ represents a melting temperature of the material to be cut, $T_v$ represents a evaporation temperature of the material to be cut, $\eta$ represents a dynamic viscosity of the melt, $\sigma$ represents a surface tension of the melt, $n_{cs}$ represents a complex refractive index of the material in the solid state, $n_{cl}$ represents a complex refractive index of the melt, and where x represents a coordinate in the direction of the relative movement between the material and the laser beam axis and z represents a coordinate perpendicular to the top of the material, and t represents a time, said method comprising the following steps in order to start the virtual cutting machine:

(a) specifying a starting point $P_0$ by acquiring the machine parameters of a current, real cutting machine, wherein the set of values $P_0$ is selected from a parameter space P, as defined above, and the parameter set $P_0$ is entered into the virtual cutting machine for the sequence of the simulation program, and thereafter starting the simulation program by (b) making a virtual cut with the virtual cutting machine that may be based on real values, wherein the progression of melt film thickness over time h=h(z,t) and the position M=M(z,t) of the melt front at the apex of the cutting front is calculated according to the depth of the cut z (0<z<d, d sheet metal thickness) and the time t from partial differential equations PDE normalized to $v_0$ $$\frac{\partial h}{\partial t} + G(z,t;h,P_0)\frac{\partial h}{\partial z} + D(z,t;h,P_0) = v_p, \frac{\partial M}{\partial t} = v_p - 1$$

with initial and boundary values $$h(z,t=0)=h_0(z), M(z,t=0)=M_0(z)$$

$$h(z=0,t)=0, M(z=0,t)=m_0(t;P_0)$$

where $h_0(z)$ and $M_0(z)$ represent any initial distributions, $m_0(t;P_0)$ the position of the upper edge of the cutting front, $v_p=v_p(z,t)$ the velocity of the melt front, $v_s=G(z,t;h,P_0)$ the flow velocity at the surface of the melt and $D(z,t;h,P_0)$ a damping of the melt film dynamics, for a given parameter set $P_0$ is calculated from P, and thereafter (c) by a projection of the time course of the absorption front, defined as the position M(z,t)–h(z,t), onto the cut face with a transfer function determined by the feed rate $v_0$ that depicts t on x, specifying the spatial distribution of the ridge amplitude R(x,z) on the cut face and calculating a spatial distribution of the burr B(x) at the lower edge of the cut face from the time course of the melt film thickness h(z=d,t) and the outflow velocity G(zd,t; h(z=d,t), $P_0$) at the lower edge of the cut face, and (d) providing a virtual cutting result comprising at least one of R(x,z) and B(x), for further assessment, whereby in an additional step values of the parameters from the parameter space P of the laser cutting process are determined for the purpose of achieving defined cut faces and/or for determining the cut faces that can be achieved with a specified laser cutting machine and/or for configuring components of an optimised laser cutting machine that meets or at least approximates the specifications regarding stated requirements on the cut face, by repeating steps a) to d) each time with changed parameters from the parameter space P, and wherein rules are derived for the continued and/or new development of components of a real laser cutting machine from the values of the parameters from the parameter space P of the laser cutting process for obtaining defined cut faces that meet or at least approximate the specifications regarding requirements on the cut faces, if the determined values cannot be transferred to a real laser cutting machine with machine-specific parameters, known as machine-specific design space $D_M$, where $D_M$ is the subset of P that can be achieved without structural changes to the real laser cutting machine.

2. A method as set forth in claim 1, wherein the damping $D(z,t;h,P_0)$ is set to zero in the partial differential equation PDE.

3. A method as set forth in claim 1, wherein in order to calculate the spatial distribution of the burr B(x) at the lower edge of the out face, the Weber number We(t) is determined as the hydro-dynamic characteristic using $h(z=d,t)$, $G(z=d,t; h(z=d,t), P_0)$ and $P_{Material}$.

4. A method as set forth in claim 1, wherein for determining the parameters at which burr formation through evaporation begins, the temperature $Ts(t)=T(M(z=d,t)-h(z=d,t),z=d,t)$ is determined on the surface of the melt, where T(x, z, t) represents the temperature in the melt.

5. A method as set forth in claim 1, wherein one or more characteristic quantity/quantitities K of the ridges and of the burr are derived for the assessment of the virtual cut quality from the virtual cutting result consisting of R(x,z) and/or B(x).

6. A method as set forth in claim 5, wherein solutions of the differential equations DE are analyzed for their dynamic stability for different initial values $h(z,t=0)=h_0(z)$ and $M(z,t=0)=M_0(z)$ using mathematical methods in order to calculate characteristic quantity/quantities K, where then, in case unstable solutions exist, lower limits for the distribution of the ridge amplitude R(x,z) can be specified based on the degree of instability and thus the respective characteristic quantity/quantities can be calculated.

7. A method as set forth in claim 1, wherein steps (a) to (d) are repeated at least once in a vicinity of the parameter set $P_0$ in the parameter space P, in order to specify for the parameter set $P_0$ the sensitivities, defined as partial mathematical derivations of the cutting result or the characteristic quantity/quantities K according to parameters from P.

8. A method as set forth in claim 1, wherein through mathematical analysis of the solution structure of the differential equations DE, the sensitivities, defined as partial mathematical derivations of the cutting result or the characteristic quantity/quantities K according to parameters from P are specified for the parameter set $P_0$.

9. A method as set forth in claim 1, wherein through automatic differentiating, the sensitivities, defined as partial mathematical derivations of the cutting result or the characteristic quantity/quantities K according to parameters from P are specified for the parameter set $P_0$.

10. A method as set forth in claim 1, wherein values of the parameters of the cut that are used to set the spatial distribution of the ridge amplitude on the cut face are specified, and used to apply an image or a logo on the cut face.

11. A method as set forth in claim 1, wherein values of the parameters of the cut are specified for which the physical limits of the smallest possible ridge amplitude are achieved.

12. A method as set forth in claim 1, wherein subsets of P and/or $D_M$ are specified, which meet or at least approximate the specifications with regard to the requirements regarding the cut faces.

\* \* \* \* \*